United States Patent
Dhoolia et al.

(10) Patent No.: US 8,806,452 B2
(45) Date of Patent: Aug. 12, 2014

(54) TRANSFORMATION OF COMPUTER PROGRAMS AND ELIMINATING ERRORS

(75) Inventors: Pankaj Dhoolia, Dadri (IN); Anup Kumar Ghosh, Kolkata (IN); Sugata Ghosal, New Delhi (IN); Asidhara Lahiri, Kolkata (IN); Mangala Gowri Nanda, New Delhi (IN); Krishna Nandivada Venkata, Chennai (IN); Anjan Nandy, Kolkata (IN); Diptikalyan Saha, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 308 days.

(21) Appl. No.: 13/293,450

(22) Filed: Nov. 10, 2011

(65) Prior Publication Data

US 2013/0125098 A1 May 16, 2013

(51) Int. Cl.
*G06F 9/45* (2006.01)

(52) U.S. Cl.
USPC ............................. 717/137; 717/140; 717/143

(58) Field of Classification Search
USPC .................................................. 717/136–143
IPC .................................. G06F 8/423,8/425, 8/427
See application file for complete search history.

(56) References Cited

U.S. PATENT DOCUMENTS

| | | | | |
|---|---|---|---|---|
| 4,667,290 A * | 5/1987 | Goss et al. | | 717/147 |
| 5,768,564 A | 6/1998 | Andrews et al. | | |
| 6,463,582 B1 * | 10/2002 | Lethin et al. | | 717/158 |
| 6,523,171 B1 | 2/2003 | Dupuy et al. | | |
| 6,728,950 B2 * | 4/2004 | Davis et al. | | 717/136 |
| 7,210,135 B2 * | 4/2007 | McCrady et al. | | 717/140 |
| 7,254,806 B1 * | 8/2007 | Yates et al. | | 717/136 |
| 7,299,459 B1 * | 11/2007 | Boyd et al. | | 717/137 |
| 7,331,043 B2 * | 2/2008 | Saulsbury | | 717/143 |
| 7,346,897 B2 * | 3/2008 | Vargas | | 717/137 |
| 7,389,498 B2 * | 6/2008 | Meijer et al. | | 717/141 |
| 7,703,085 B2 * | 4/2010 | Poznanovic et al. | | 717/140 |
| 7,721,270 B2 * | 5/2010 | Ukelson et al. | | 717/136 |
| 7,779,394 B2 * | 8/2010 | Homing et al. | | 717/136 |
| 7,810,080 B2 * | 10/2010 | Plum et al. | | 717/140 |
| 7,962,904 B2 * | 6/2011 | Zabokritski | | 717/143 |
| 7,971,195 B2 * | 6/2011 | Ringseth et al. | | 717/137 |
| 8,316,356 B2 * | 11/2012 | Frey | | 717/139 |
| 8,495,591 B2 * | 7/2013 | Miceli | | 717/129 |
| 2004/0158820 A1 | 8/2004 | Moore et al. | | |
| 2006/0041862 A1 | 2/2006 | Moussallam et al. | | |

(Continued)

OTHER PUBLICATIONS

Robillard et al, "Static Analysis to Support the Evolution of Exception Structure in Object-Oriented Systems", ACM Transactions on Software Engineering and Methodology, vol. 12, No. 2, pp. 191-221, 2003.*

(Continued)

*Primary Examiner* — Anil Khatri
(74) *Attorney, Agent, or Firm* — Schmeiser, Olsen & Watts, LLP; John Pivnichny

(57) ABSTRACT

A method and system to transform a plurality of programs associated with a plurality of programming languages is provided. In the method, a request is received by a computer to transform a first program in a first programming language to a second program in a second programming language. The first program is then transformed, wherein the transformation includes eliminating errors using predefined criteria. Further, the method maps a statement of the first program with a corresponding statement of the second program.

20 Claims, 12 Drawing Sheets

(56) References Cited

U.S. PATENT DOCUMENTS

2007/0038985 A1 2/2007 Meijer et al.
2008/0222616 A1 9/2008 Cheng et al.
2009/0019430 A1 1/2009 Jaeger et al.

OTHER PUBLICATIONS

G'omez-Rodriguez et al, "Dependency Parsing Schemata and Mildly Non-Projective Dependency Parsing", ACM, vo. 37, No. 3, pp. 541-586, 2011.*

Wang et al, "A Policy-driven Exception Handling Approach for Service-oriented Processes", IEEE, pp. 449-455, 2012.*

Lerner et al, "Exception Handling Patterns for Processes", ACM, pp. 55-61, 2014.*

Qiu, Lili, "Programming Language Translation", Cornell University, Ithaca, NY, May 1999, pp. 1-14 and 2 pages abstract, http://ecommons.library.cornell.edu/handle/1813/7400.

Waters, Richard C., "Program Translation via Abstraction and Reimplementation", IEEE Transactions on Software Engineering, vol. 14, No. 8, Aug. 1988, pp. 1207-1228.

Aho, Alfred V., Ullman, Jeffrey D., "The Theory of Parsing, Translation, and Compiling", vol. 1: Parsing, Prentice-Hall Series in Automatic Computation, Prentice-Hall Inc., Englewood Cliffs, NJ, 1972, pp. 72, 73-75, 77, 367, 578, 579, and 644.

Carbonell, Jamie G., Hayes, Philip J., "Recovery Strategies for Parsing Extragrammatical Language", American Journal of Computational Linguistics, vol. 9, Nos. 3-4, Jul.-Dec. 1983, pp. 123-146.

Kontogiannis, K. et al., "Code Migration Through Transformations: An Experience Report", In Proceedings of Cason '98, Toronto ON, Dec. 1998, pp. 1-13.

Fleurey, F. et al., "Model-Driven Engineering for Software Migration in a Large Industrial Context", MoDELS 2007, Springer-Verlag, Berlin Heidelberg 2007, pp. 482-497.

Zou, Y. et al., "Towards a Web-centric Legacy System Migration Framework", in the Proceeding of ICSE 2001 Workshops of International Workshop on Net-Centric Computing: Migrating to the Web (NCC2001), pp. 1-5.

* cited by examiner

TRANSFORMATION OF COMPUTER PROGRAMS AND ELIMINATING ERRORS

FIELD OF THE INVENTION

Embodiments of the present invention relate to a field of transforming a first program to a second program.

BACKGROUND OF THE INVENTION

Today, as the computer programming languages, for example High Level Language (HLL), continue to grow rapidly, programmers often need to translate a computer program written in one HLL to another HLL. This translation may be necessary because of: lack of skilled programmers in the another HLL; when a user is not accustomed with concepts of the HLL in which the computer program is available; business decisions to switch underlying platforms; the desire of the programmers or the users to convert the computer program to another language; or in a scenario, where the computer may not be able to execute and support the available computer program, due to specific hardware or software requirements. Thus, in such scenarios the computer program in one HLL can be translated to another HLL.

The translation can be done manually by the programmers, but the manual translation is a laborious, time consuming, and an expensive process which is also prone to errors. To address this problem, automatic translators have been developed to translate programs written in one HLL (source program) to another HLL (target program).

Generally, for translating the source program to the target program using automatic translators, the source program is first given as an input to a parser. The parser checks for errors in the source program and further builds a data structure of the source program. Examples of errors include, but are not limited to, parsing errors, syntax errors, and compilation errors.

The parser during the parsing process throws a parsing exception and halts the parsing process, if any parser errors are identified while parsing a statement in the source program. The parsed source program is then given as input to the automatic machine translator (hereinafter referred as translator). The translator translates the parsed source program to the target program. The translator can throw a translation exception and interrupt the translation process if any translation errors are identified during translation. Hence in the above translation method, the parsing process and the translation process is interrupted and halted when a parser error or a translation error occurs.

Moreover, as the translation is a machine translation it is also prone to errors. To identify such errors, the target program can be analyzed manually or automatically after the translation process. The errors in the target program can be easily identified while analyzing, however it is difficult for the user to identify the actual origin/source of the errors. Hence, if the error has occurred due to the error present in the source program then in such a scenario, the user have to identify the errors in the source program by manually analyzing the source program and the target program simultaneously. Thus, manually analyzing the source code and the target code is a time consuming and tedious job for the user.

Hence there exists a need to efficiently manage the transformation of computer programs.

BRIEF SUMMARY OF THE INVENTION

According to one embodiment of the present invention, a method for transforming a first program to second program is provided. The method includes a computer receiving a request to transform the first program to the second program and a computer transforming the first program to the second program, wherein the transformation includes eliminating errors using predefined criteria.

According to another embodiment of the present invention, a computer system for transforming a first program to a second program is provided. The computer system includes one or more processors. The one or more processors includes program instructions to receive a request to transform the first program to the second program and transform the first program to the second program wherein the transformation includes eliminating errors using a predetermined criteria.

According to yet another embodiment of the present invention, a computer program product (cpp) for transforming a first program to second program is provided. The computer program product comprises one or more computer-readable tangible storage devices and program instructions stored on at least one or more storage devices, the program instructions comprising program instructions to receive a request to transform the first program to the second program and program instructions to transform the first program to the second program, wherein the transformation includes eliminating errors using predefined criteria.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

BRIEF DESCRIPTION THE DRAWINGS

Figure 1:
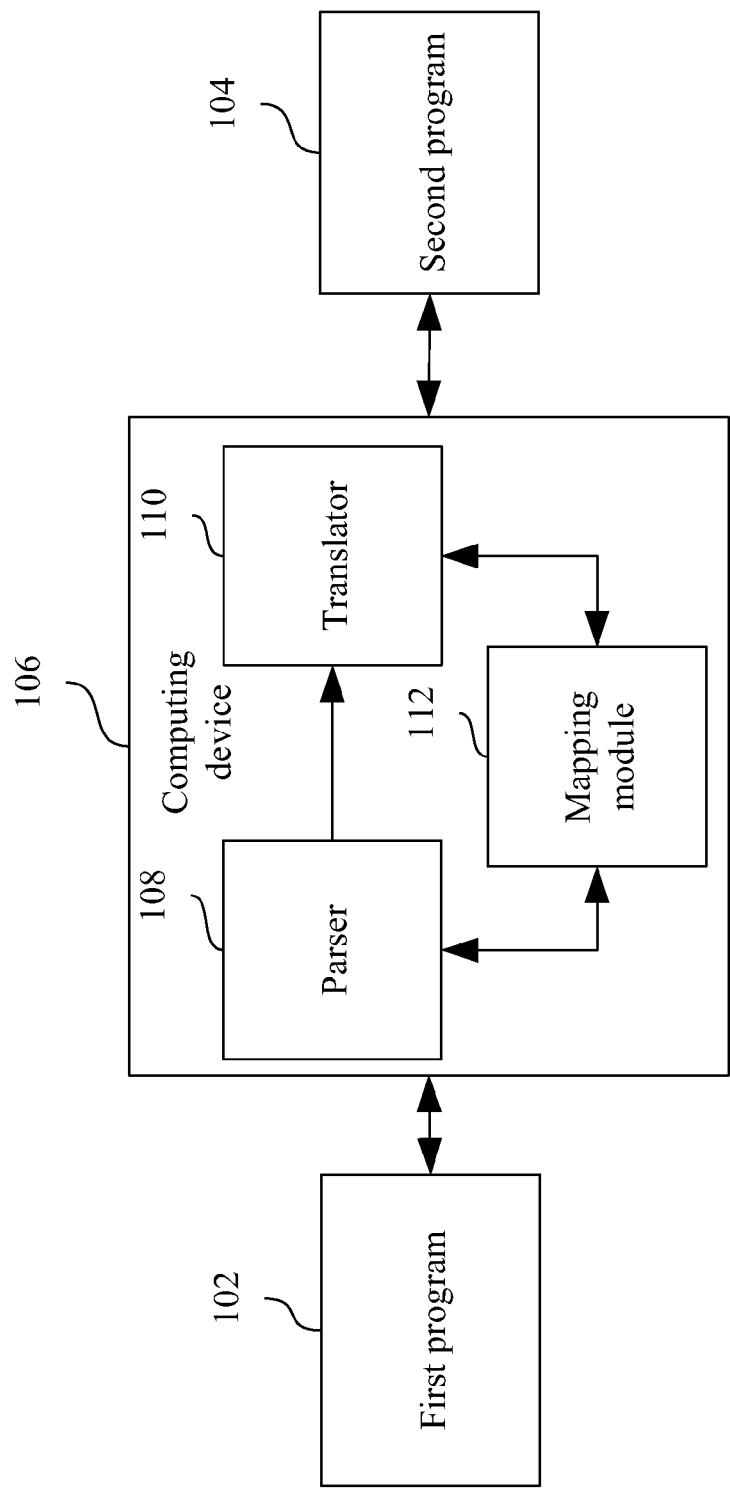
FIG. 1 is a functional overview of an apparatus for transforming a plurality of programs, in accordance with an embodiment of the invention.

(Java® is a registered trademark of Sun Microsystems, Inc), in accordance with an embodiment of the present invention.

DETAILED DESCRIPTION OF THE INVENTION

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments of the invention. One skilled in the relevant art will recognize, however, that the various embodiments of the invention can be practiced without one or more of the specific details, or with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

FIG. 1 through 10, as discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Further, terms such as "first", "second", etc., are used to differentiate between objects having the same terminology and are nowhere intended to represent a chronological order, except where stated otherwise. A set is defined as a non-empty set including at least one element.

FIG. 1 is a functional overview of an apparatus for transforming a plurality of programs, in accordance with an embodiment of the invention.

Referring to FIG. 1, an exemplary apparatus to transform a first program 102 in a first programming language to a second program 104 in a second programming language is provided. In an embodiment, the first programming language is a proprietary High Level Language (HLL) program. An example of a proprietary HLL is an ABAP™ language which is used for business purposes. In an embodiment, the second programming language is a generic purpose HLL language. An example of generic purpose programming language is Java®.

A computing device 106 initially receives a request to transform first program 102 to second program 104. Examples of computing device 106 include a desktop computer, laptop, palmtop, smart phone, Personal Digital Assistants (PDAs), and the like. First program 102 is then given as an input to computing device 106.

In an embodiment, first program 102 is stored in a memory (not shown) associated with computing device 106 and the stored first program is given as the input to the computing device. In another embodiment, first program 102 is given as an input from an external input device. In yet another embodiment, first program 102 is given as an input in a run time environment. In the embodiment, the input is given to computing device 106 directly from a program editor.

For the sake of clarity and for the purposes of this description, computing device 106 is shown to include a parser 108, a translator 110 and a mapping module 112. Though, only three components are shown in computing device 106, the scope of the invention is not limited to only three components and a person having ordinary skill in the art may use more than three components to perform the method described hereinbelow.

In an embodiment, parser 108 is a line parser that parses one line of code at one time Parser 108 parses each statement of first program 102 sequentially and checks for any parser errors in the first program. Parser 108 will also build a data structure of first program 104. In the embodiment, the data structure is an annotated Abstract Syntax Tree (AST). The AST is a tree representation of the abstract structure of a source program, for example first program 102. In an embodiment, the AST is created by tokenizing first program 102. Tokenizing is the process of forming one or more tokens from an input stream of characters from first program 102. The one or more tokens created by tokenizing first program 102 are then defined based on their usage in first program 102. Hence, the one or more tokens of first program 102 is annotated based on their usage in first program. In an embodiment, the token is annotated with either a 'use' annotation or a 'define' annotation. The use annotation is assigned to the tokens that are being used in first program 102 to define one or more tokens. Similarly, the define annotation is assigned to tokens that are defined in first program 102 using one or more tokens. For example, in the expression 'a=b+c', the tokens 'b' and 'c' are being used to define the token 'a', thus tokens 'b' and 'c' are associated with use annotation and token 'a' is associated with define annotation. The operation to tokenize an exemplary expression of first program 102 is discussed in more detail in conjunction with FIG. 2.

Further, an AST is created for the exemplary expression after tokenizing the expression. The operation to create the AST is discussed in more detail in conjunction with FIG. 3 hereinbelow. Thereafter, one or more tokens of the exemplary expression in the AST are annotated using either a use annotation or a define annotation. The operation to annotate one or more tokens in the AST is discussed in more detail in conjunction with FIG. 4 hereinbelow.

Parser 108 can also throw a parsing exception, if parser errors are identified while parsing first program 102. The parsing exception is defined as an interrupt in normal processing, when an error condition occurs while parsing a computer program. Identified parser errors are then handled and rectified automatically using a predefined parsing method. The predefined parsing method will allow parser 108 to parse the whole program completely without any interruptions and without halting the parsing process. The predefined parsing method shall be discussed in more detail in conjunction with FIG. 5 hereinbelow.

Parsed first program 102 is then given as an input to translator 110. Translator 110 Then translates parsed first program 102 to second program 104. Translator 110 can throw a translation exception, if any translation errors are identified while translating parsed first program 102. The translation exception is defined as an interrupt in normal processing, when an error condition occurs while translating a parsed computer program. The identified translation errors are then handled automatically using a predefined translation method. The predefined translation method is discussed in more detail in conjunction with FIG. 6 hereinbelow. The predefined translation method will allow translator 110 to translate the complete first parsed program 102 to second program 104, without throwing any translation exceptions and without halting the translating process.

Mapping module 112 in computing device 106, maps one or more statements of first program 102 to one or more statements of second program 104 based on the translation process and their logically equivalence. In this embodiment, the mapping of the first program and the second program is performed using a look-up table. The lookup table maps a statement of the first program with a corresponding statement of the second program. In an example, a statement at line number five of first program 102 is mapped to a plurality of statements at line numbers four, five and six of translated second program 104 and vice-versa, if the statement at line number five is equivalent to the plurality of statements. Further, an entry is also made to the look-up table.

The translated program, for example second program 104 is then given as an output of computing device 106. Second program 104 can then be analyzed for any faults and errors. The faults and errors identified in second program 106 can be mapped to a section of a code in first source 102 based on the mapping performed by mapping module 112. Thus, the errors can be easily analyzed and rectified in first program 102 and in second program 104.

Figure 2:
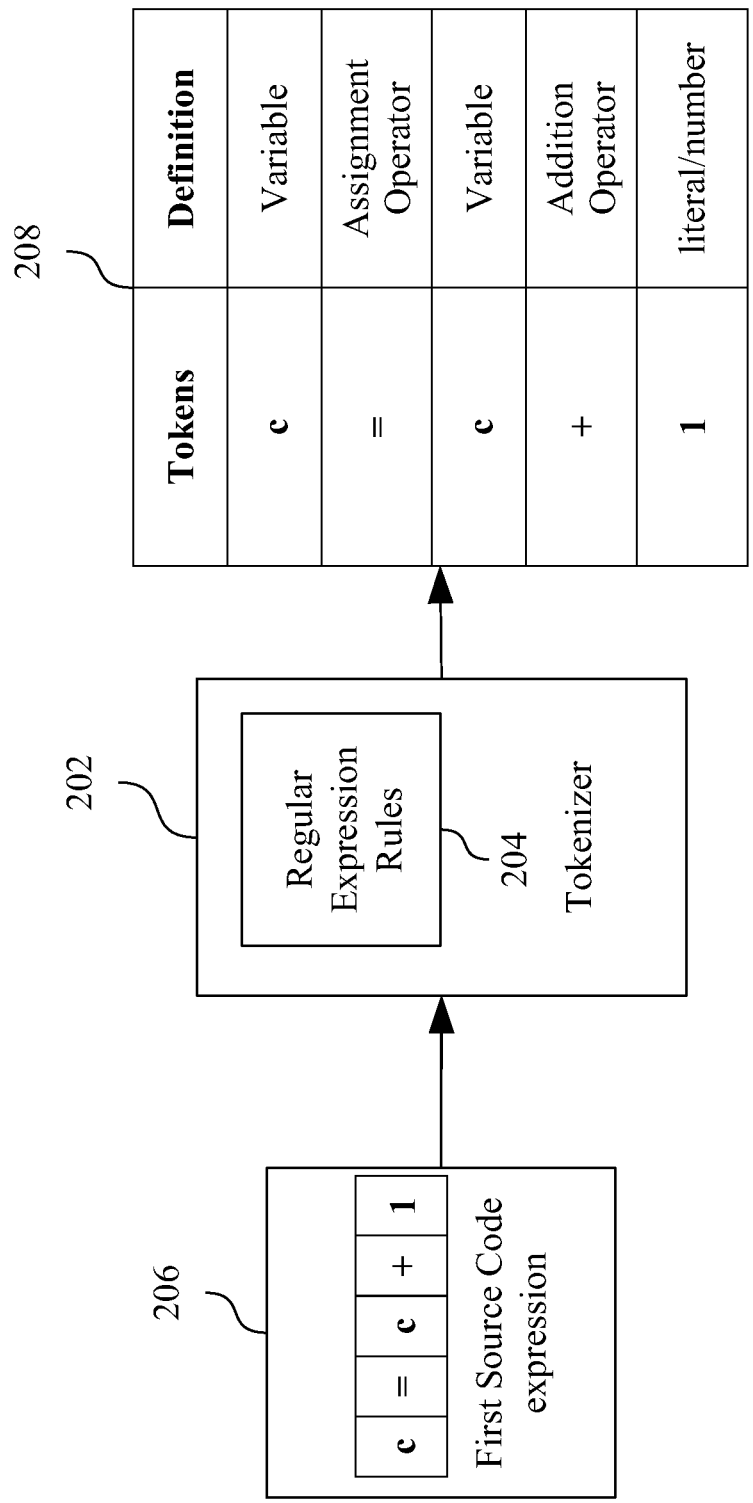
FIG. 2 illustrates an operation to tokenize an exemplary expression in a first program, in accordance with an embodiment of the invention.

Referring to FIG. 2, a tokenizer 202 identifies tokens from first program 102. Tokenizer 202 includes regular expression rules 204. Tokenizer 202 identifies and defines tokens in each statement of first program 102 based on regular expression rules 204. In an embodiment, tokenizer 202 is a lexical analyzer that analyzes text in first program 102. The lexical analyzer is a program which performs lexical analysis. The lexical analysis is the process of converting a sequence of characters of a program into a sequence of tokens. Regular expression rules 204 represent patterns that may be contained in the analyzed text. Examples of regular expression include identifiers, operators, numbers, and the like.

Definitions of various types of regular expressions, for example, identifiers, operators, literals, numbers are explained further with examples. The identifiers/variables are identified as a sequence or combination of letters 'a'-'z' or 'A'-'Z'. The assignment operator is defined as the character '='. Similarly, an addition operator is defined as the character '+' and the numbers is a sequence of characters '0'-'9'. The regular expressions mentioned above are solely for the purpose of this description and do not limit the invention to the above mentioned regular expressions.

Each statement of first program 102 is processed consecutively as a stream of characters by tokenizer 202. An exemplary statement of first program 102 is an expression 206. Expression 206, for example 'c=c+1', includes a variable, number and operator. Tokenizer 202 scans each character from a stream of characters associated with expression 206. The scanned characters are then processed on the basis of regular expression rules 204. As a result, a list of tokens 208 is generated. The list of tokens generated from expression 206 are 'c', '=', 'c', '+', and '1'.

In the generated list of tokens 208, the token 'c' is defined as a variable and '1' as literal/number. A token '=' is defined as an assignment operator and a token '+' is defined as a sum operator. As shown, generated list of tokens 208 is represented along with description of the type of tokens. Similarly, complete first program 102 can be processed to form a list of tokens. Subsequently, list of tokens 208 is processed by parser 108 to generate an AST. The operation to generate the AST is explained in conjunction with FIG. 3.

Figure 3:
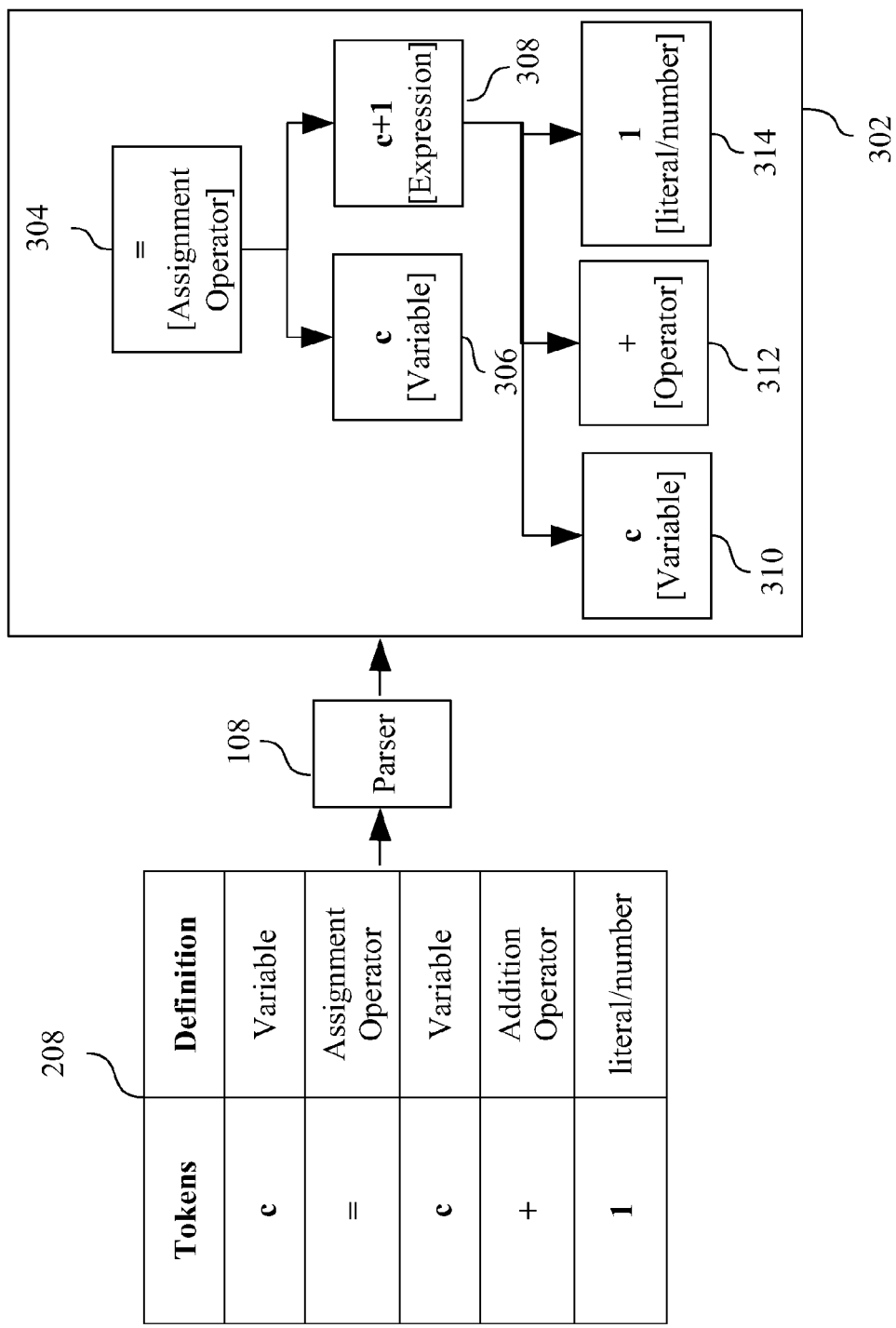
FIG. 3 illustrates an operation of a parser to create an Abstract Syntax Tree (AST) of the exemplary expression, in accordance with an embodiment of the invention.

Referring to FIG. 3, list of tokens 208 are analyzed by parser 108 and an AST 302 is generated. AST 302 is a grammatical data structure and defines relationships between each token in list of tokens 208. AST 302 is generated based on grammar rules defined in parser 108. The grammar rules defined in parser 108 can be a context-free grammar or an attribute grammar.

For the sake of clarity an exemplary grammar rule for an assignment statement is explained below.

The assignment statement is identified based on the assignment operator ('='). The assignment statement is defined as "identifier=expression". In the assignment statement, the right side of the assignment operator ('=') includes expression and the left side of the assignment operator includes identifier/variable. The expression can be a literal or a binary expression. The binary expression can include literals, numbers or identifier, and operators.

Therefore, based on the above example, the expression shown in 206 of FIG. 2, that is 'c=c+1', is termed as an assignment statement. Similarly, based on the above rules, the statement 'c+1' is termed as a binary expression.

AST 302 comprises one or more data nodes. The data nodes include a hierarchal data structure that represents the structure of expression 206 in first program 102. For example, AST 302 created for expression 206 includes a plurality of data nodes, for example data node 304, 306, 308, 310, 312 and 314. Data node 304 includes the assignment operator '=', data node 306 includes the identifier/variable 'c', and data node 308 includes the binary expression 'c+1'.

Similarly, data nodes 310, 312, and 314 include variable, number and operator, which are subsets of the binary expression. Therefore data node 310 includes the variable 'c', data node 312 includes the operator '+' and data node 314 includes the literal/number '1'. In an embodiment, parser 108 can be programmed based on the requirement of the programmer. For example, parser 108 can be programmed such that it also annotates one or more tokens of AST 302. The operation to annotate AST 302 is further explained in conjunction with FIG. 4 hereinbelow.

Figure 4:
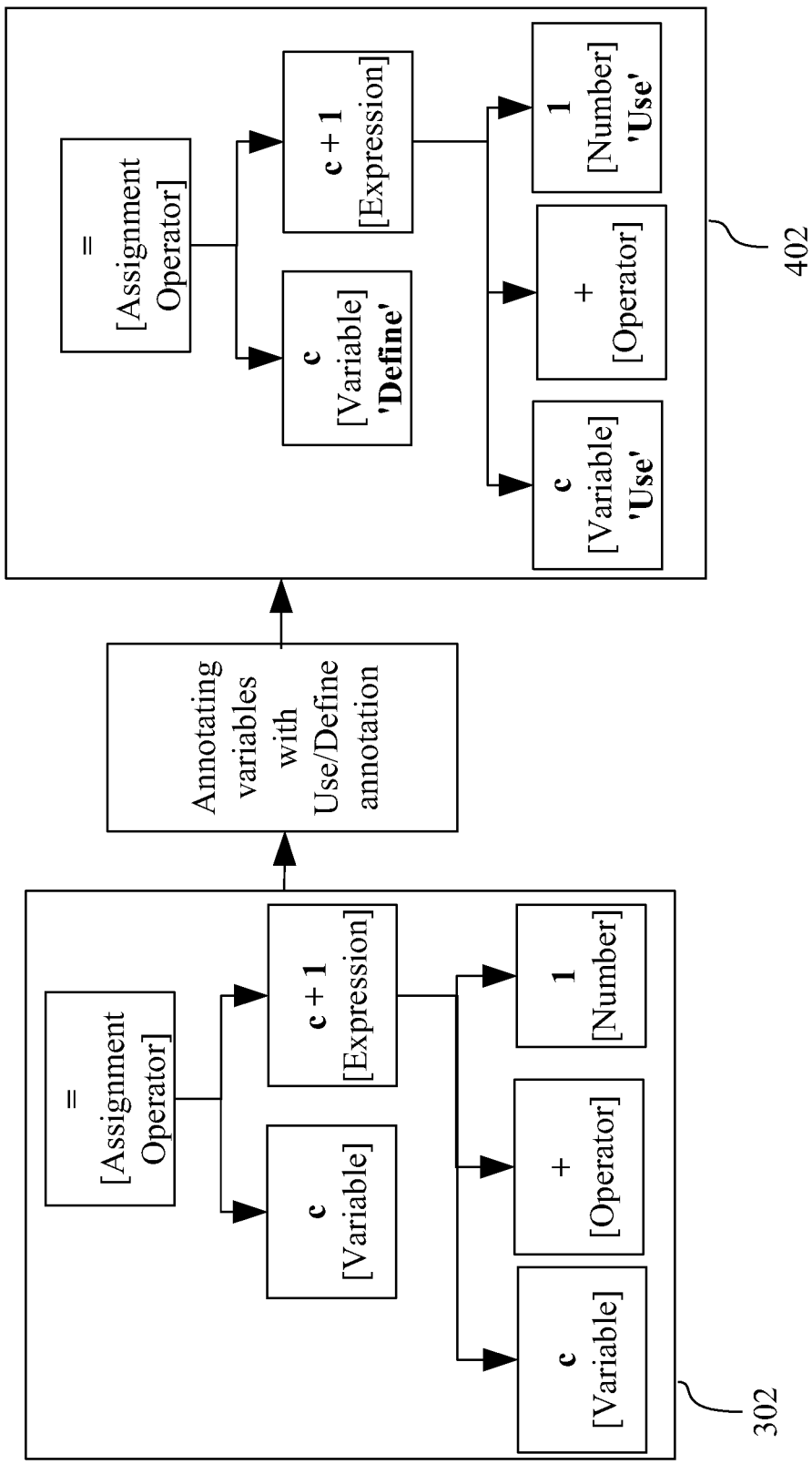
FIG. 4 illustrates an operation to create an annotated AST, in accordance with an embodiment of the invention.

Referring to FIG. 4, the variables and literals in the AST are annotated based on a use and define concept. In the use and define concept, variables of an expression are annotated with define annotation if they are defined (or calculated) in the expression using one or more variables and literals. Similarly, variables or literals of an expression are annotated with 'use' annotation, if the variables or literals are used in the expression to define a variable that is associated with the define annotation. For example, in the expression 206, the variable 'c' and the numeric value '1' are added and their sum is assigned to the variable 'c'. Hence, the variable 'c' and the numeric value '1' (at the right side of the expression) are used in the expression to define the variable 'c'.

AST 302 is annotated based on the above description and an annotated AST 402 is created. In annotated AST 402, the variable 'c' that is at the left of the assignment operator (at the left side of the expression) is annotated with the term define and similarly, the variable 'c' and the number/literal '1' are annotated with the term use as shown in FIG. 4. Annotated AST 402 is then used in a predefined parsing method explained in conjunction with FIG. 5 and a predefined translation method explained in conjunction with FIG. 6 hereinbelow.

Figure 5:
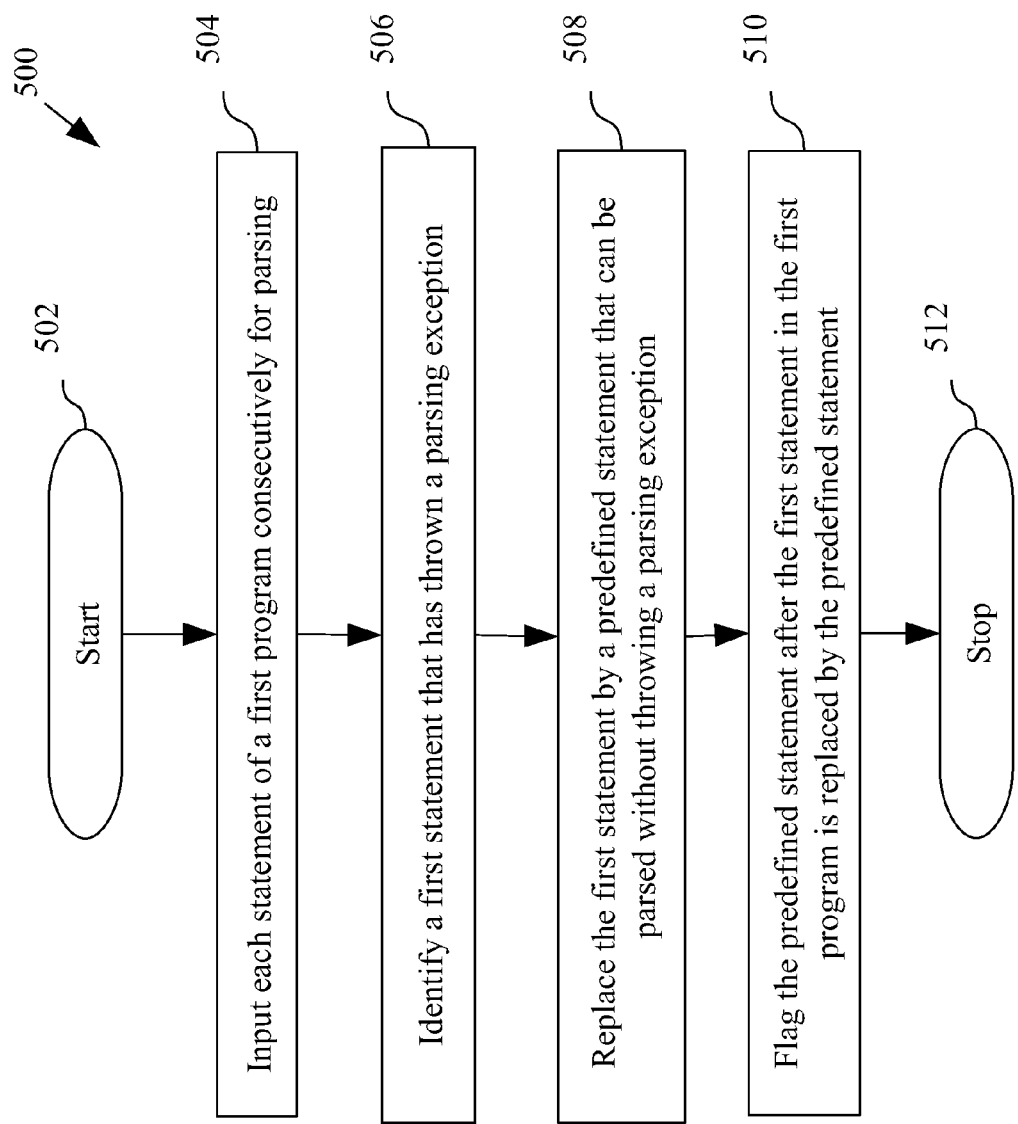
FIG. 5 illustrates a flowchart representing a procedure to implement a predefined parsing method, in accordance with an embodiment of the present invention.

Referring to FIG. 5, predefined parsing method 500 is used when parser 108 identifies parser errors and throws a parsing exception while parsing the program. Predefined parser method 500 allows parser 108 to parse the complete program without interrupts even when there are parser errors in the program. In an embodiment, predefined parsing method 500 is completely performed by a processor in computing device 106.

At step 502, predefined parsing method 500 is initiated. In an embodiment, predefined parsing method 500 is initiated by parser 108 when a parsing exception occurs while parsing first program 102. At step 504, parser 108 inputs each statement of first program 102 consecutively for parsing. At step 506, a first statement that has thrown a parsing exception is identified. At step 508, predefined method 500 then replaces the first statement by a predefined statement that can be parsed without throwing a parsing exception. The predefined statement is an executable equivalent statement to the first statement and includes an annotated AST of the first statement.

At step 510, the predefined statement is flagged after the first statement in first program 102 is replaced by the predefined statement. The flagging of the statement enables programmers and translators to trace statements in first program 102 that are replaced with the executable equivalent statements during the parsing process. For the sake of clarity, the above method is explained using the following example.

In first program 102, expression 206, which is recognized and correctly parsed by the parser, can be written in various ways. For example, expression 206, that is 'c=c+1', can also be represented as 'c:=c+1', 'c+=1', 'c++', and the like. Hence, if first program 102 includes an expression 'c:=c+1' then parser 108 may not be able to recognize the expression 'c:=c+1', if the rule to analyze the expression is not defined in the parser. Thus in such a scenario, predefined parsing method 500 will use various combinations to identify an executable equivalent statement. For example, in the above example, predefined parsing method 500 may automatically remove and/or include some characters in the expression to make it executable equivalent expression.

Hence, based on the explanation above, parser 108 can remove a colon ":" from the expression 'c:=c+1'. Parser 108 will then be able to analyze the expression as the rule for parsing the expression 'c=c+1', after removing the colon ":", is already present in the parser. Thus, parsing of the expression 'c:=c+1' will neither throw a parsing exception nor will it interrupt the parsing method. Thus in such a scenario, expression 'c:=c+1' is replaced by 'c=c+1' that can be parsed without throwing a parsing exception. In an embodiment, the predefined statement is identified based on its use and defined annotation of expression 208. The executable equivalent statement is then flagged. At step 512, the predefined parsing method 500 is terminated.

Figure 6:
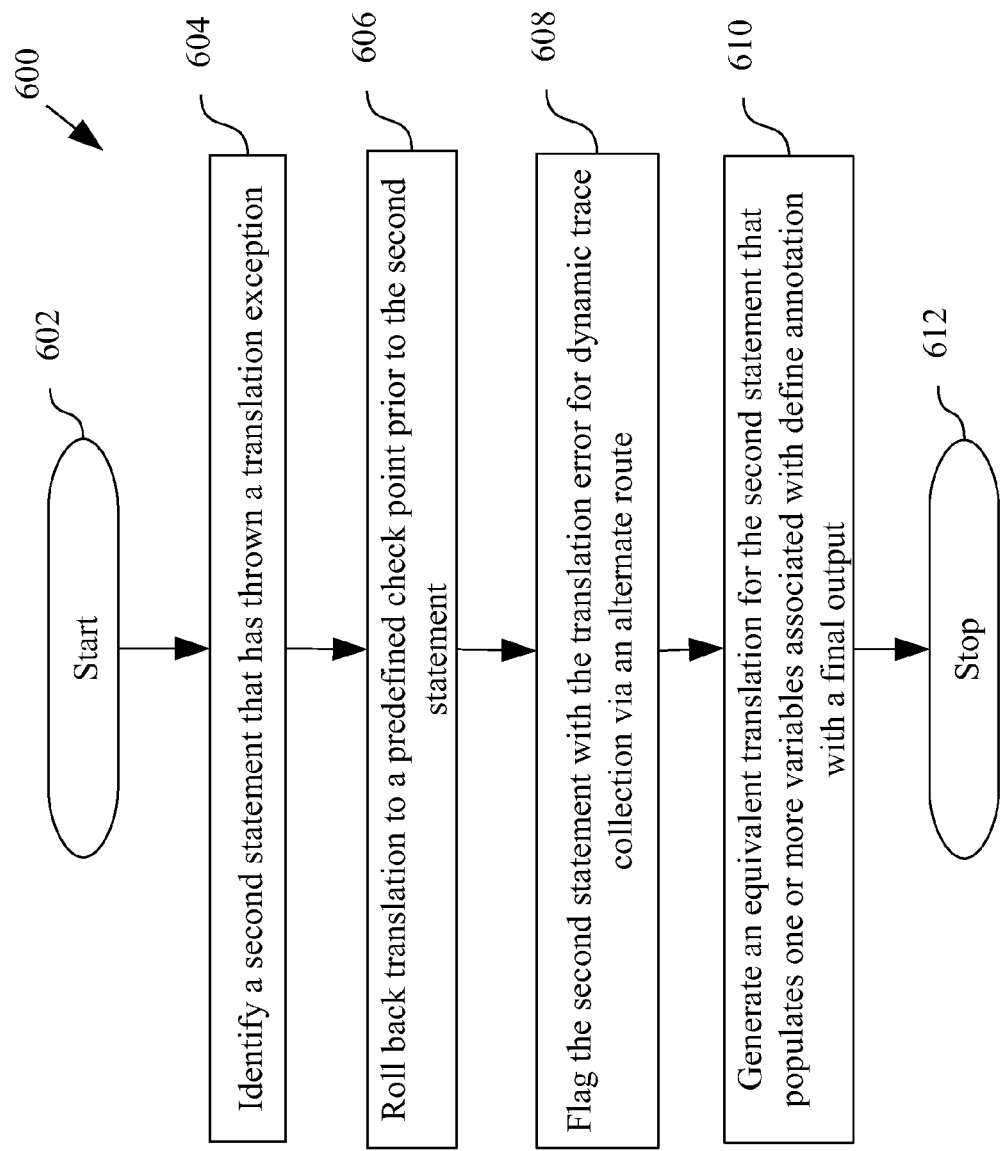
FIG. 6 illustrates a flowchart representing a procedure to implement a predefined translation method, in accordance with an embodiment of the present invention.

Referring to FIG. 6, a predefined translation method 600 is implemented when translator 110 identifies translation errors and throws a translation exception while translating a program, for example parsed first program 104. Predefined translation method 600 allows translator 110 to translate parsed first program 102 completely without interrupts even when there are translation errors in the parsed first program. In an embodiment, the predefined translation method is completely performed by the processor in the computing device.

At step 602, predefined translation method 600 is initiated. In an embodiment, predefined translation method 600 is initiated by translator 110 when a translation error is identified in parsed first program 102 and a translation exception is thrown.

At step 604, method 600 identifies a second statement that has thrown a translation exception while translating a parsed program, for example parsed first program 102. The translation exception is thrown when the translation errors are identified by translator 110 during the translation process. In an embodiment, the second statement will throw a translation exception when a rule to translate the second statement is not present in translator 110.

At step 606, the translated program is rolled back to a predefined check point prior to the second statement. The predefined checkpoint is associated with a statement that was successfully translated during the translation process. At step 608, the second statement with the translation error is flagged for dynamic trace collection via an alternate route.

At step 610, method 600 will generate an equivalent translation for the second statement that populates one or more variables associated with define annotation with a final output. The final output is identified by using one or more variables associated with use annotation in the AST.

In an example, a translation exception is thrown for a statement if a rule to translate the statement is not included in translator 110. In the example, the statement includes a variable that is populated based on a value of the expression. Thus, predefined translation method 600 flags the statement for dynamic trace collection and will identify the value of the variable from an alternate route. Thereafter the identified value is directly assigned to the variable and the statement is then translated to the target language. At step 612, the predefined translation method 600 is terminated.

Figure 7:
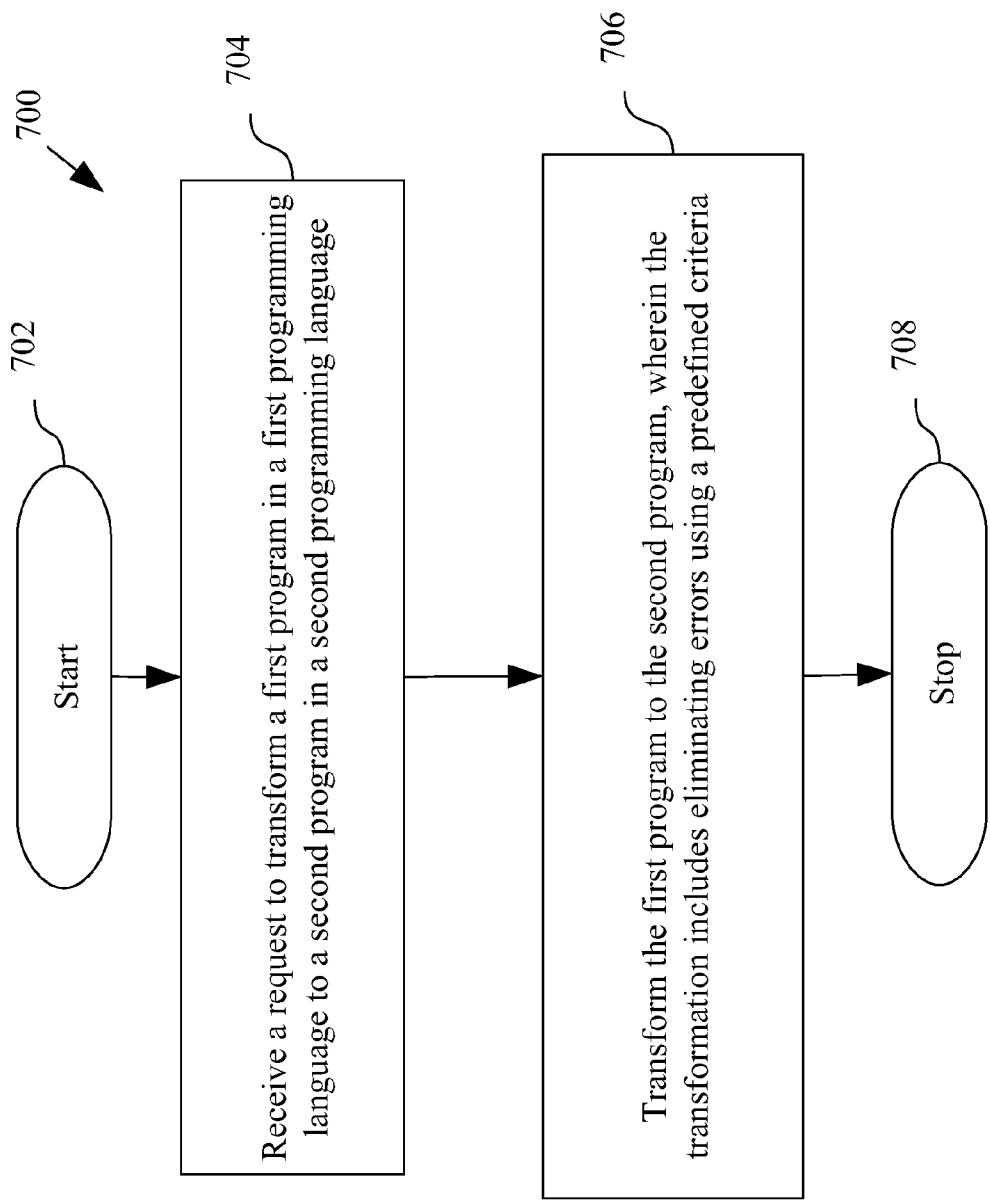
FIG. 7 illustrates a flowchart diagram representing a method for transforming a plurality of programs, in accordance with an embodiment of the invention.

Referring to FIG. 7, a method 700 to transform a plurality of programs is initiated at step 702. In an embodiment, the method 700 is performed by one or more computers. At step 704, a request to translate a first program in a first programming language to a second program in a second programming language is received. In an embodiment, method 700 is performed by a processor in the computing device. In an embodiment, method 700 receives a request to translate first program 102 to second program 104.

In an embodiment, the first programming language and the second programming language is an HLL, an Object Oriented Programming (OOP) language or a conventional procedural programming language. In an embodiment, first program 102 is a proprietary language program and second program 104 is a general purpose language program.

At step 706, first program 102 is transformed completely to the second program without interrupts. The first program is transformed to the second program by eliminating errors using a predefined criteria. For transforming, the first program is first parsed and the parsed first program is then translated. In an embodiment, a parsing exception occurs while parsing the first code.

In an embodiment, the predefined criteria is obtained by a predefined method. In the predefined method a plurality of tokens is identified associated with the first program. This is explained in detail in conjunction with FIG. 2. In the predefined method the plurality of tokens is annotated using the use and defined annotation. This is explained in detail in conjunction with FIG. 4.

In method 700, a parsing exception that occurred during parsing is automatically handled using predefined parsing method 500. The predefined parsing method is explained in detail in conjunction with FIG. 5 supra. In an embodiment, parser 108 parses first program 102. In an embodiment, parsed first program 102 is translated to second program 104 without interrupts, by automatically handling translation exceptions occurred during translation.

In an embodiment, the translation exceptions are handled using predefined translation method 600. Predefined translation method 600 is explained in detail in conjunction with FIG. 6 supra. In an embodiment, method 700 creates a bridging framework where the parsing process and the translation process are performed. The bridging framework is explained in detail in conjunction with FIG. 8 hereinbelow.

In an embodiment, method 700 maps one or more statements in second program 104 with one or more statements in first program 102 and vice versa. In the embodiment, second program 104 can then be analyzed for faults and errors, thus one or more errors can be identified in the second program based on the analysis. Thereafter, method 700 can determine a section of a program in first program 102 that corresponds to statements including the one or more errors in second program 104. In an embodiment, the section of the program is identified based on the mapping performed between first program 102 and second program 104. Mapping is performed using a look-up table. The lookup table maps a statement of the first program with a corresponding statement of the second program. At step 708, method 700 is terminated.

Figure 8:
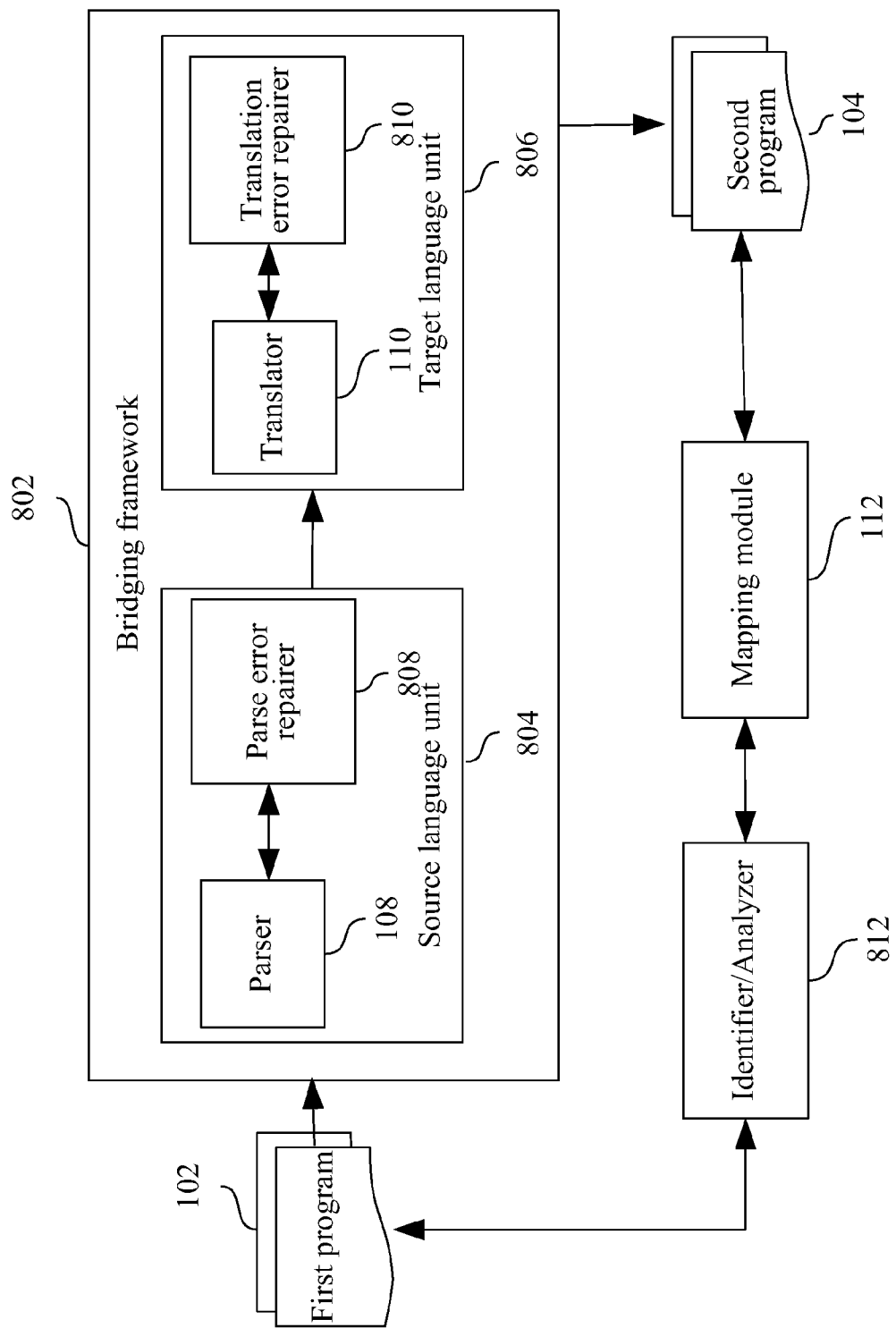
FIG. 8 illustrates an exemplary system for transforming the plurality of programs, in accordance with an embodiment of the invention.

Referring to FIG. 8, first program 102 is given as an input to a bridging framework 802. In an embodiment, bridging framework 802 is created by computing device 106. Bridging framework 802 enables translation of programs by creating program language bridges. Bridging framework 802 includes a source language unit 804 and a target language unit 806. Bridging framework 802 creates a bridge between source language unit 804 and target language unit 806 that enables translation of program first 102.

Source language unit 804 includes parser 108 and a parser error repairer 808. In an embodiment, parser 108 is a line parser. Parser 108 parses each statement of first program 102 to create an annotated AST, for example annotated AST 402. However, if parser 108 identifies any parser error while parsing, then parser error repairer module 808 repairs the identified parser errors automatically in runtime, using predefined parsing method 500. In an embodiment, a parser grammar and a set of parser rules associated with first program 102 is included (not shown) in the source language unit 804. Hence, source language unit 804 is associated with first program 102.

Parsed first program 102 is then given as an input to target language unit 806. Target language unit 806 includes translator 110 and a translation error repairer 810. In an embodiment, the target language unit includes rules to create second program 104 using annotated AST 402. Hence, target language unit 806 is associated with second program 104. Translator 110 translates each statement of first program 102 to second program 104 without any interrupts. However, if translator 110 identifies any translation errors in translation, then a translator error repairer 810 repairs the identified translation errors automatically in runtime using predefined translation method 600. Bridging framework 802 then gives second program 104 as an output to computing device 106 which is free from translation error and parser error.

Mapping module 112 then maps one or more statements of second program 104 with One or more statements of first program 102. In an embodiment, the mapping is performed using a look-up table. The lookup table maps a statement of the first program with a corresponding statement of the second program. Further, an identifier/analyzer 812 can analyze second program 104 and identify if there are any errors or faults in the second program.

A section of source code in first program 102 is then identified based on the mapping. The section of the source code in first program 102 corresponds to statements that include the identified errors or faults in second program 104. The section of source code from first program 102 and the errors and faults identified in second program 104 can then be given as an output for analysis. Hence, the output can then be analyzed and the faults and errors can be rectified.

Figure 9A:
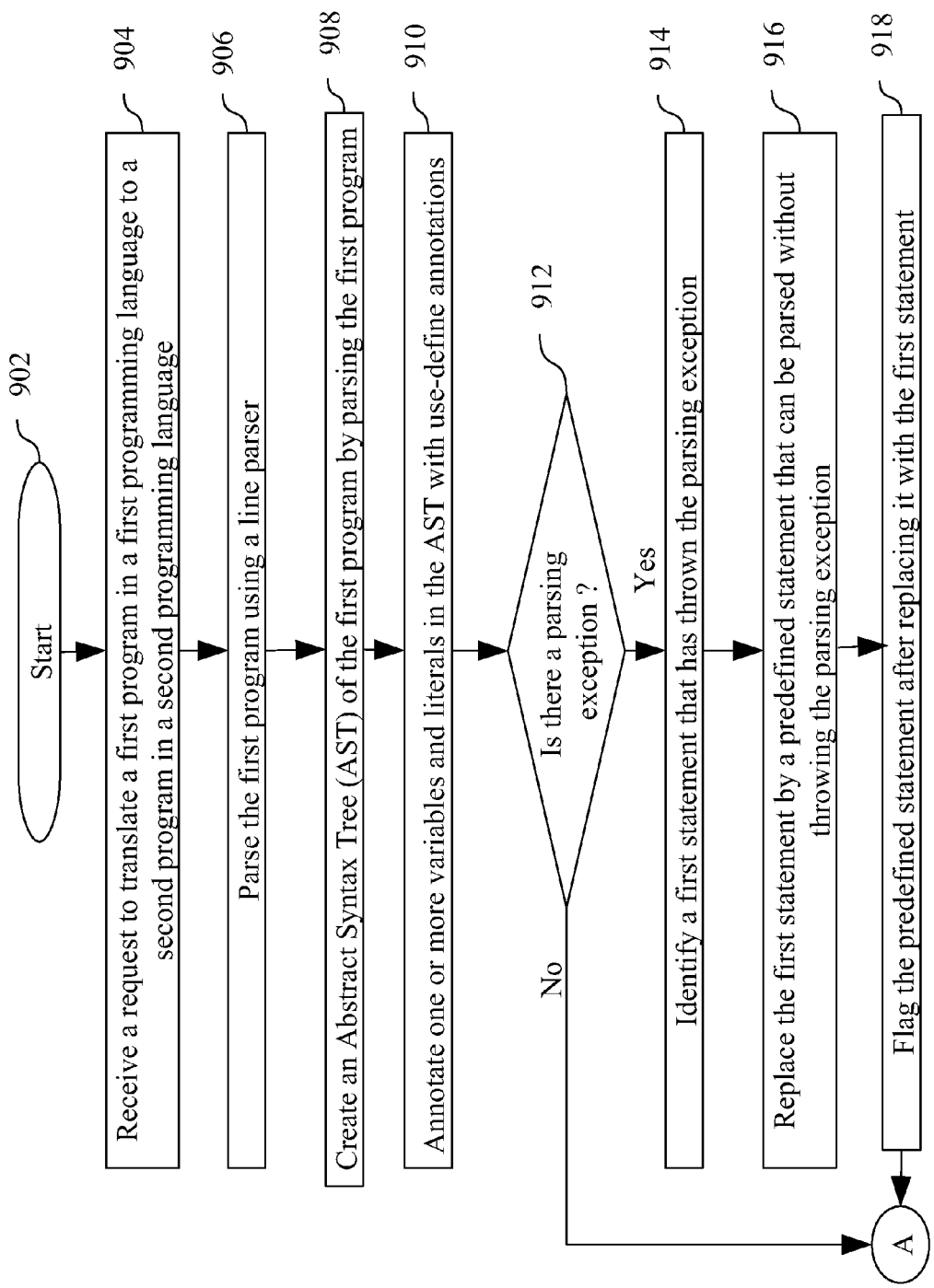
FIG. 9A, FIG. 9B and FIG. 9C illustrate a flowchart diagram representing a method to transform the plurality of programs in accordance with another embodiment of the invention.

Referring to FIG. 9A, the method is initiated at step 902. At step 904, a request is received to translate a first program (for example, first program 102) in a first programming language to a second program (for example, second program 104) in a second programming language. In an embodiment, the request is received by a processor in computing device 106. First programming language can be a proprietary programming language. An example of proprietary HLL includes Advanced Business Application Programming that is used for business purposes. Second programming language can be a general purpose programming language. Examples of generic purpose programming language include C, C++, Java®, and the like.

At step 906, first program 102 is parsed by parser 108. In an embodiment, parser 108 is a line parser. The line parser parses each statement of first program 102 consecutively. At step 908, an AST of first program 102 is created by parsing the first program. In an embodiment, the AST is created by parser 108. An exemplary method to create an AST is described in conjunction with FIG. 2 and FIG. 3. FIG. 2 describes a method to tokenize each statement of first program 102 and create tokens. FIG. 3 describes the method to create the AST using the created tokens and their definitions.

At step 910, one or more variables and literals in the AST are annotated with use-define annotations. An exemplary annotated AST 402 is shown in FIG. 4. At step 912, the method checks if there are any parsing exception thrown by parser 108, while parsing first program 102. A step 914 is performed, if there are any parsing exceptions otherwise a step 920 (see FIG. 9B) is performed. At step 914, a first statement that has thrown a parsing exception is identified from first program 102. At step 916, the first statement is replaced by a predefined statement that can be parsed without throwing the parsing exception. In an embodiment, the predefined statement is an executable equivalent statement to the first statement and includes an annotated AST of the first statement.

At step 918, the predefined statement is flagged after the first statement is replaced by the predefined statement. The flagging of the statement enables programmers and translator 110 to track statements that are replaced with the executable equivalent statements during the parsing process. The parsed first program is then given as an input to translator 110 at step 920 of FIG. 9B.

Figure 9B:
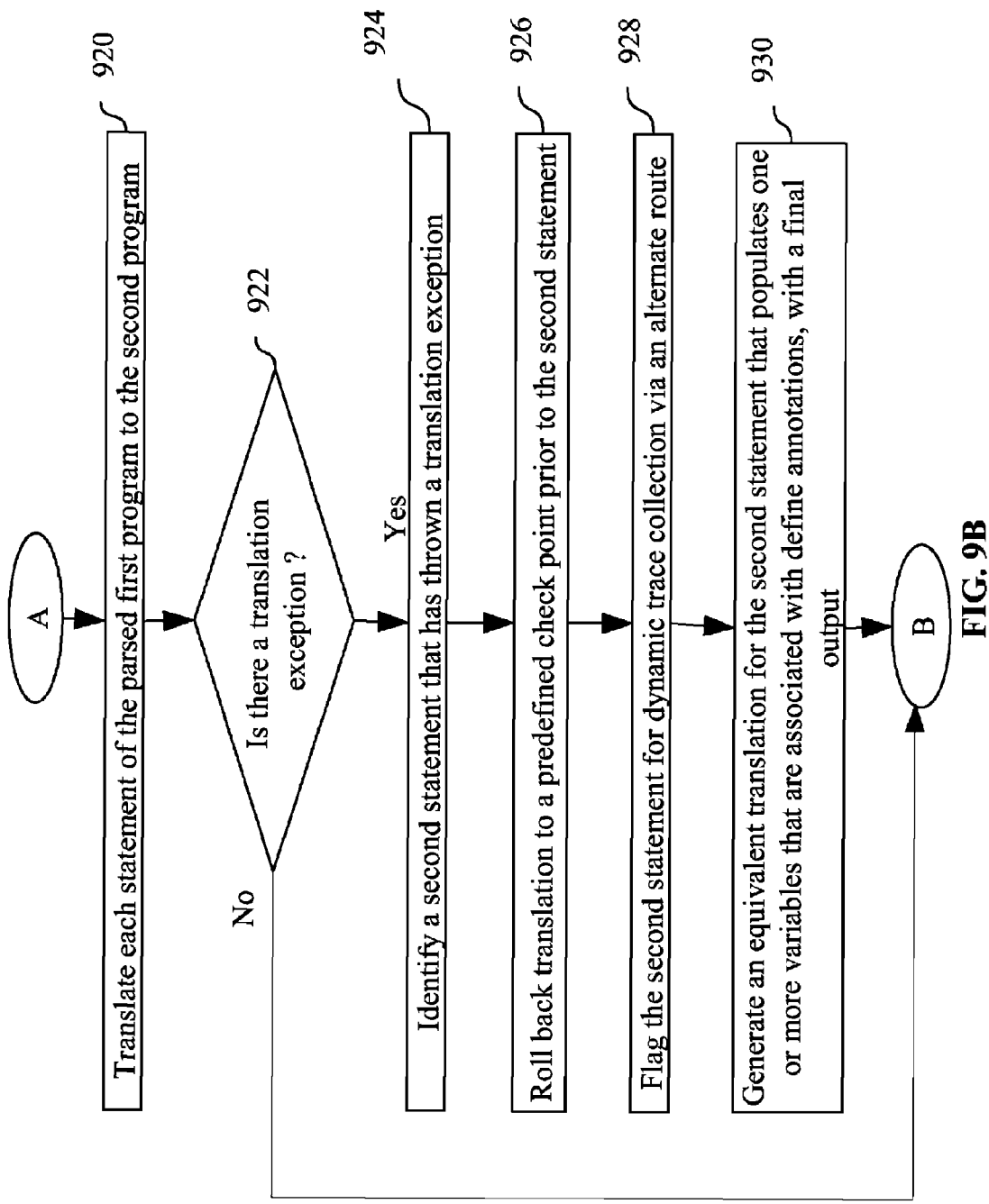

Referring to FIG. 9B, at step 920 each statement of parsed first program 102 is translated to one or more statements in second program 104. In an embodiment, translator 110 performs the translation process. At step 922, the method checks if there is any translation exception during the translation process. A step 924 is performed if a translation exception is thrown during the translation process otherwise a step 934 is performed (see FIG. 9C).

At step 924, a second statement from parsed first program 102 is identified. The second statement is a statement that has thrown the translation exception while translating first program 102 to second program 104. The translation exception is thrown when translation errors are identified by translator 110 during the translation process. In an embodiment, the second statement will throw a translation exception when a rule to translate the second statement is not present in translator 110.

At step 926, the translated program is rolled back to a predefined check point prior to the second statement. The predefined checkpoint is associated with a statement that was successfully translated during the translation process. At step 928, the second statement including the translation error is flagged for dynamic trace collection via an alternate route.

At step 930, an equivalent translation for the second statement is generated that populates one or more variables, that are associated with define annotations, with a final output. The final output is identified by using one or more variables associated with use annotation in the annotated AST. The translated program, for example second program 104 and first program 102 is then mapped (see FIG. 9C, step 934, described herein below). In an embodiment, the mapping is performed using a look-up table. The lookup table maps a statement of the first program with a corresponding statement of the second program.

Figure 9C:
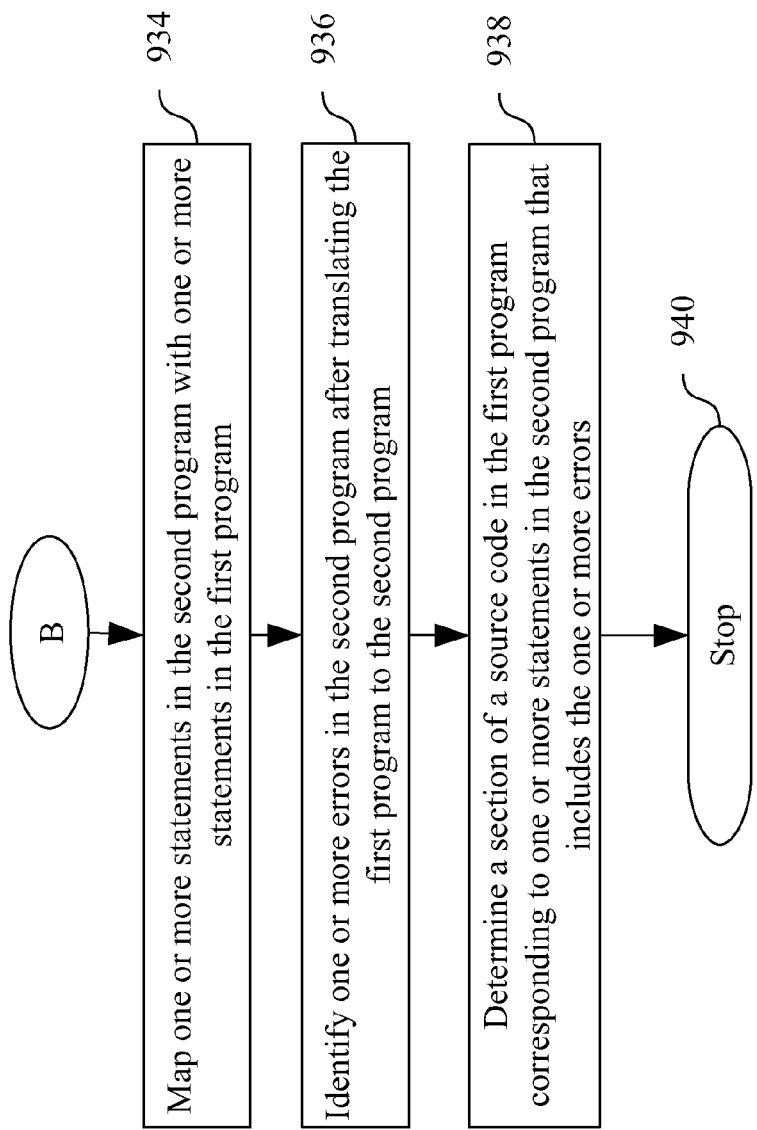

Referring to FIG. 9C, at step 934, one or more statements in second program 104 are mapped with one or more statements in first program 102 and vice versa. Second program 104 can then be analyzed for faults and errors. At step 936, one or more errors can be identified in second program 104. At step 938, a section of a source code in first program 102 is determined that corresponds to statements that includes the one or more errors in second program 104. In an embodiment, the section of the source code is identified based on the mapping performed at step 934. In an embodiment, the above method is performed by the processor of computing device 106. At step 940, the method is terminated.

Figure 10:
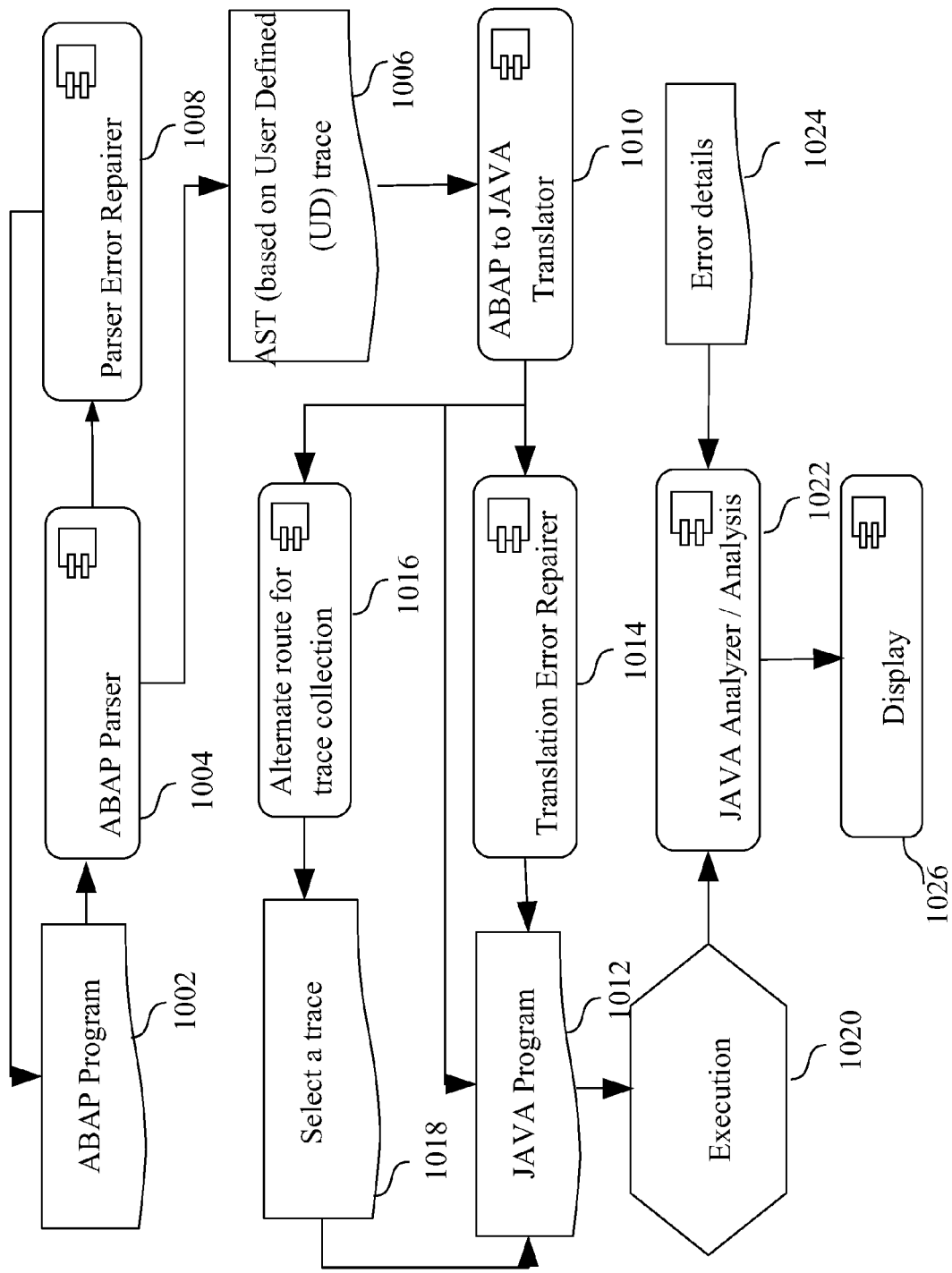
FIG. 10 illustrates an exemplary flowchart diagram representing a method to translate an Advanced Business Application Programming (ABAP™) language program to a Java® language program and analyze the ABAP™ and the Java® language programs (ABAP™ is a trademark of SAP AG)

Referring to FIG. 10, an ABAP™ program 1002 is translated to a Java® program 1012 and thereafter, ABAP™ program 1002 and Java® program 1012 is analyzed. FIG. 10 describes and demonstrates an exemplary method within the scope of the invention. The example is given solely for the purpose of clarity and illustration and is not to be constructed as limitation of the present invention as many variations are thereof possible. Further, for the purpose of this description the term ABAP™ will be referred as ABAP and the term Java® will be referred as Java.

As shown, ABAP program 1002 is given as an input to an ABAP parser 1004. ABAP parser 1004 parses ABAP program 1002 and creates an annotated AST 1006 of ABAP program 1002. However, if ABAP parser 1004 identifies any parser errors in ABAP program 1002 then a parser error repairer 1008 repairs the parser error. Parser error repairer 1008 replaces a first statement containing the parser error with a predefined statement that is equivalent to the first statement and does not include parser errors. Thereafter, the predefined statement is included in ABAP program 1002 and is again sent for parsing.

AST 1006 is then given as an input to an ABAP to a Java translator 1010. ABAP to Java translator 1010 translates each statement of ABAP program 1002 to Java program 1012. ABAP to Java translator 1010 can perform three steps during the translation process. The first step includes translating the statement in ABAP program 1002 to a statement in Java program 1012, if a rule to convert the statement is present in the ABAP to Java translator 1010. The translated statement is then assembled to Java program 1012.

The second step includes passing the first statement to a translation error repairer 1014, if there are any translation exceptions. The translation exception occurs when a rule to translate the statement of ABAP program 1002 is not present in ABAP to Java translator 1010. Translation error repairer 1014 generates an executable equivalent statement of the statement that does not throw a translation exception. The executable equivalent statement is then assembled in Java program 1012.

The third step includes identifying an Alternate route for trace collection 1016. This step is performed when specific type of statement occurs in ABAP program 1002. An example of a specific type of statement in the ABAP program 1002 includes a statement to read a database. In such a scenario, the ABAP to Java translator 1010 may perform a Java translation that similarly reads from the database but that statements may not get executed properly, as the SAP® databases are exposed only to the ABAP languages and not the Java language (translated language). Hence, in such a scenario a trace from an external mechanism is collected. The external mechanism to identify and collect traces for a statement is performed at step 1016. Thereafter, a trace of the statement is selected at step 1018. The trace of the statement is defined as variables and values that are produced after executing the statement of the ABAP program 1002. Hence, the variables and the values are identified using an alternate route and these are directly included in Java program 1012.

Java program 1012 can then be executed at step 1020. A Java Analyzer 1022 can then analyze Java program 1012 for errors based on a received Error Details 1024. In an example, Error Details 1024 can be received by a user or the Error Details can be extracted from a memory. The errors in Java program 1012 can be analyzed and a section of code in ABAP program 1002 corresponding to the statements that includes the errors in the Java program can determined. The statements in Java program 1012 including the identified errors and the section of code in ABAP program 1002 corresponding to the statement that includes errors can then be displayed at step 1026.

Various embodiments of the present invention described above may provide at least, but are not limited to, the following advantages.

The present invention provides a method for transforming plurality of programs associated with plurality of programming languages. The method parses a complete program without interruptions by automatically handling a parsing exception using a predefined parsing method in a runtime environment.

The method also translates the parsed program completely without interruptions by automatically handling a translation exception using a predefined translation method in a runtime environment. The method efficiently translates a program in one HLL to a program in another HLL without throwing any exception. Thus, the method reduces time associated with the parsing process and the translation process. The method reduces manual intervention in handling the parsing exceptions and the translation exceptions.

The method further enables a user to analyze errors in the plurality of programs. The user can identify errors and faults in a target program and based on the errors identified the method will determine a section of program in a source program that corresponds to statements that includes the one or more identified errors. Furthermore, aspects may take the form of a computer program product embodied in one or more computer readable medium(s) having computer readable program code embodied therewith Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, et cetera, or any suitable combination of the foregoing.

Computer program code for carrying out operations for various aspects may be written in any combination of one or more programming languages, including an object oriented programming language such as Java™, Smalltalk, C++ or the like and conventional procedural programming languages, such as the "C" programming language or similar programming languages. The program code may execute entirely on a single computer (device), partly on a single computer, as a stand-alone software package, partly on single computer and partly on a remote computer or entirely on a remote computer or server. In the latter scenario, the remote computer may be connected to another computer through any type of network, including a local area network (LAN) or a wide area network (WAN), or the connection may be made for example through the Internet using an Internet Service Provider.

Aspects are described herein with reference to flowchart illustrations and/or block diagrams of methods, apparatuses (systems) and computer program products according to example embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Although illustrated example embodiments have been described herein with reference to the accompanying drawings, it is to be understood that embodiments are not limited to those precise example embodiments, and that various other changes and modifications may be affected therein by one skilled in the art without departing from the scope or spirit of the disclosure.

What is claimed is:

1. A method for transforming a first computer program having a plurality of program statements to a second computer program, said method comprising:
    parsing, by one or more processors, each program statement in the first computer program, wherein said parsing comprises: (i) identifying, in the first computer program, a first program statement that includes a first error and has thrown a parsing exception with respect to the first error prior to said parsing, and (ii) replacing the first program statement by a predefined program statement that is an executable equivalent program statement to the first program statement and can be parsed without throwing any parsing exception;
    translating, by the one or more processors, the parsed first computer program to the second computer program, wherein said translating comprises: (i) identifying a second program statement in the parsed first computer program that includes a second error and has thrown a translation exception with respect to the second error prior to said translating, (ii) rolling back said translating to a predefined check point prior to the second program statement in the parsed first computer program such that the predefined check point is associated with a statement in the parsed first computer program that was successfully translated during said translating, and (iii) generating an executable equivalent translation for the second statement that does not throw a translation exception; and after said translating, generating, by the one or more processors, a mapping of one or more statements in the second computer program to one or more statements in the first computer program.

2. The method of claim 1, wherein said parsing parses the whole first computer program completely without any interruptions and without halting said parsing and without throwing any exception even though the first computer program includes the first error, and wherein said translating translates the whole parsed first computer program completely without any interruptions and without halting said translating and without throwing any exception even though the parsed first computer program includes the second error.

3. The method of claim 1, wherein said parsing further comprises flagging the predefined program statement after said replacing the first program statement, and wherein said translating further comprises utilizing the flagged predefined program statement to trace the first program statement.

4. The method of claim 1, wherein said translating further comprises flagging the second program statement, and wherein the method further comprises:
utilizing, by the one or more processors, the flagged second program statement to collect traces for the second program statement, using an alternate route, to identify variables and values that are produced from executing the second program statement.

5. The method of claim 1, said method further comprising:
identifying, by the one or more processors, one or more errors included in the one or more statements in the second computer program; and
utilizing, by the one or more processors, the mapping to determine a section of a source code in the first computer program corresponding to the errors included in the one or more statements in the second computer program.

6. The method of claim 1, wherein the executable equivalent translation for the second statement populates one or more variables associated with a define annotation in an abstract syntax tree (AST) with respect to a final output that is identified by using the one or more variables associated with a use annotation in the AST, and wherein the AST is a hierarchical tree representation of the first computer program's structure.

7. The method of claim 6, wherein the AST comprises a representation of one program statement in the first computer program in a structure that comprises:
a top node including an assignment operator in the one program statement;
a first node at a first level of the tree directly below the top node, said first node including a define annotation for one variable in the one program statement; and
a second node at a second level of the tree directly below the first level, said second node including a use annotation for the one variable.

8. A computer program product, comprising one or more computer readable hardware storage devices storing computer readable program code therein, said program code containing instructions which, upon being executed by one or more processors of a computer system, implement a method for transforming a first computer program having a plurality of program statements to a second computer program, said method comprising:
parsing, by one or more processors, each program statement in the first computer program, wherein said parsing comprises: (i) identifying, in the first computer program, a first program statement that includes a first error and has thrown a parsing exception with respect to the first error prior to said parsing, and (ii) replacing the first program statement by a predefined program statement that is an executable equivalent program statement to the first program statement and can be parsed without throwing any parsing exception; and
translating, by the one or more processors, the parsed first computer program to the second computer program, wherein said translating comprises: (i) identifying a second program statement in the parsed first computer program that includes a second error and has thrown a translation exception with respect to the second error prior to said translating, (ii) rolling back said translating to a predefined check point prior to the second program statement in the parsed first computer program such that the predefined check point is associated with a statement in the parsed first computer program that was successfully translated during said translating, and (iii) generating an executable equivalent translation for the second statement that does not throw a translation exception; and
after said translating, generating, by the one or more processors, a mapping of one or more statements in the second computer program to one or more statements in the first computer program.

9. The computer program product of claim 8, wherein said parsing parses the whole first computer program completely without any interruptions and without halting said parsing and without throwing any exception even though the first computer program includes the first error, and wherein said translating translates the whole parsed first computer program completely without any interruptions and without halting said translating and without throwing any exception even though the parsed first computer program includes the second error.

10. The computer program product of claim 8, wherein said parsing further comprises flagging the predefined program statement after said replacing the first program statement, and wherein said translating further comprises utilizing the flagged predefined program statement to trace the first program statement.

11. The computer program product of claim 8, wherein said translating further comprises flagging the second program statement, and wherein the method further comprises:
utilizing, by the one or more processors, the flagged second program statement to collect traces for the second program statement, using an alternate route, to identify variables and values that are produced from executing the second program statement.

12. The computer program product of claim 8, said method further comprising:
identifying, by the one or more processors one or more errors included in the one or more statements in the second computer program; and
utilizing, by the one or more processors, the mapping to determine a section of a source code in the first computer program corresponding to the errors included in the one or more statements in the second computer program.

13. The computer program product of claim 8, wherein the executable equivalent translation for the second statement populates one or more variables associated with a define annotation in an abstract syntax tree (AST) with respect to a final output that is identified by using the one or more variables associated with a use annotation in the AST, and wherein the AST is a hierarchical tree representation of the first computer program's structure.

14. The computer program product of claim 13, wherein the AST comprises a representation of one program statement in the first computer program in a structure that comprises:
 a top node including an assignment operator in the one program statement;
 a first node at a first level of the tree directly below the top node, said first node including a define annotation for one variable in the one program statement; and
 a second node at a second level of the tree directly below the first level, said second node including a use annotation for the one variable.

15. A computer system comprising one or more processors, a memory coupled to the one or more processors, and one or more computer readable hardware storage devices coupled to the processors, said one or more computer readable hardware storage devices containing program code which, upon being executed by the one or more processors via the memory, implements a method for transforming a first computer program having a plurality of program statements to a second computer program, said method comprising:
 parsing, by the one or more processors, each program statement in the first computer program, wherein said parsing comprises: (i) identifying, in the first computer program, a first program statement that includes a first error and has thrown a parsing exception with respect to the first error prior to said parsing, and (ii) replacing the first program statement by a predefined program statement that is an executable equivalent program statement to the first program statement and can be parsed without throwing any parsing exception; and
 translating, by the one or more processors, the parsed first computer program to the second computer program, wherein said translating comprises: (i) identifying a second program statement in the parsed first computer program that includes a second error and has thrown a translation exception with respect to the second error prior to said translating, (ii) rolling back said translating to a predefined check point prior to the second program statement in the parsed first computer program such that the predefined check point is associated with a statement in the parsed first computer program that was successfully translated during said translating, and (iii) generating an executable equivalent translation for the second statement that does not throw a translation exception; and
 after said translating, generating, by the one or more processors, a mapping of one or more statements in the second computer program to one or more statements in the first computer program.

16. The computer system of claim 15, wherein said parsing parses the whole first computer program completely without any interruptions and without halting said parsing and without throwing any exception even though the first computer program includes the first error, and wherein said translating translates the whole parsed first computer program completely without any interruptions and without halting said translating and without throwing any exception even though the parsed first computer program includes the second error.

17. The computer system of claim 15, wherein said parsing further comprises flagging the predefined program statement after said replacing the first program statement, and wherein said translating further comprises utilizing the flagged predefined program statement to trace the first program statement.

18. The computer system of claim 15, wherein said translating further comprises flagging the second program statement, and wherein the method further comprises:
 utilizing, by the one or more processors, the flagged second program statement to collect traces for the second program statement, using an alternate route, to identify variables and values that are produced from executing the second program statement.

19. The computer program product of claim 15, said method further comprising:
 identifying, by the one or more processors one or more errors included in the one or more statements in the second computer program; and
 utilizing, by the one or more processors, the mapping to determine a section of a source code in the first computer program corresponding to the errors included in the one or more statements in the second computer program.

20. The computer system of claim 15, wherein the executable equivalent translation for the second statement populates one or more variables associated with a define annotation in an abstract syntax tree (AST) with respect to a final output that is identified by using the one or more variables associated with a use annotation in the AST, and wherein the AST is a hierarchical tree representation of the first computer program's structure.

* * * * *